(No Model.)

J. R. LITTLE.
PROCESS OF MANUFACTURING METAL WHEELS.

No. 386,325. Patented July 17, 1888.

Witnesses:
Jas. E. Hutchinson
Henry C. Hazard

Inventor,
Jas. R. Little, by
Crindle and Russell, his Attys.

UNITED STATES PATENT OFFICE.

JAMES R. LITTLE, OF QUINCY, ILLINOIS, ASSIGNOR TO THE QUINCY METAL WHEEL COMPANY, OF SAME PLACE.

PROCESS OF MANUFACTURING METAL WHEELS.

SPECIFICATION forming part of Letters Patent No. 386,325, dated July 17, 1888.

Application filed November 2, 1887. Serial No. 254,116. (No model.)

*To all whom it may concern:*

Be it known that I, JAMES R. LITTLE, of Quincy, in the county of Adams, and in the State of Illinois, have invented certain new and useful Improvements in the Process of Manufacturing Metal Wheels; and I do hereby declare that the following is a full, clear, and exact description thereof, reference being had to the accompanying drawings, in which—

Figure 1:
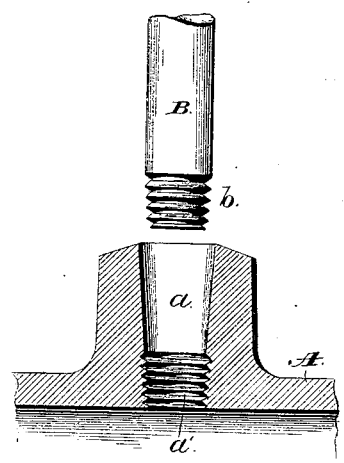
Figure 2:
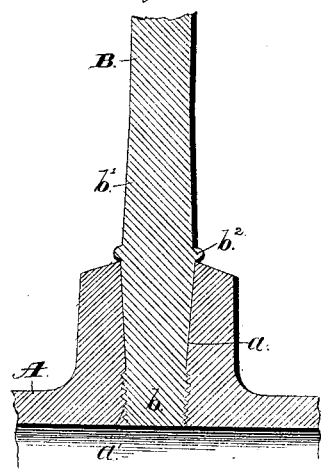
Figure 3:
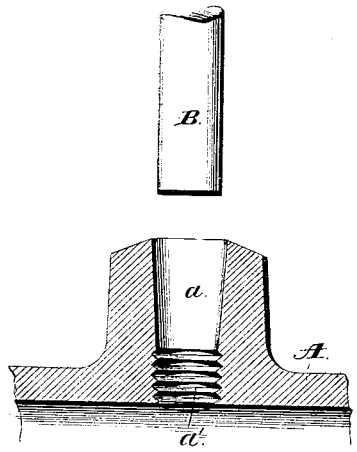
Figure 4:
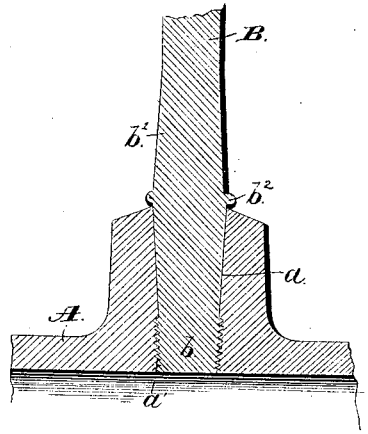

Figure 1 is a section of a hub having a threaded mortise and a side elevation of a threaded tenon-spoke for use in such mortise. Fig. 2 is a section of said parts after being united. Fig. 3 is a section of a hub having a threaded mortise and a side elevation of a plain tenon-spoke for use therein, and Fig. 4 is a section of the same after they have been united.

Letters of like name and kind refer to like parts in each of the figures.

The design of my invention is to increase the strength and durability of metal wheels; and to this end my said invention consists in the methods employed, substantially as and for the purpose hereinafter specified.

In the carrying of my invention into use, I form within a wheel-hub, A, a radial mortise, $a$, which increases in diameter from its inner end to its outer end, and within the inner portion of such mortise preferably cut a screw-thread, $a'$. For use within the mortise $a$ there is provided a spoke, B, which is cut from a straight bar, and at its end $b$ is preferably threaded to fit the threaded portion $a'$ of said mortise. The spoke thus constructed is inserted into and screwed to place within its mortise, after which the portion of said spoke outside of the hub is grasped between suitable jaws and compressed longitudinally until the whole of said mortise is closely filled by the lateral expansion of the metal of said spoke, and there is formed upon the latter outside of said hub an enlargement, $b'$, which preferably terminates in a bead, $b^2$, at the outer end of the mortise.

If desired, the thread upon the inner end of the spoke may be omitted and the spoke inserted into the threaded mortise and compressed longitudinally, as before, in which event the lateral expansion of said spoke will cause its inner end to fit into and fill the threaded portion of said mortise, as shown in Fig. 4.

In consequence of the outwardly-increasing diameter of the spoke-opening, every portion is thoroughly filled by the longitudinal compression of the spoke, and a firm solid joint is produced at such point, which joint is adapted to resist any possible pressure from without, while by the use of the threaded inner end of said mortise said spoke is firmly anchored in place against outward strain.

Having thus described my invention, what I claim is—

1. As an improvement in the construction of metal wheels, the method employed for securing a spoke within a hub, which consists in forming a mortise having an outwardly-increasing diameter and a threaded inner portion, and then placing within such mortise the end of a spoke, and by longitudinal compression (and lateral expansion) causing the same to fill said mortise, substantially as and for the purpose specified.

2. As an improvement in the construction of metal wheels, the method employed for securing a spoke within a hub, which consists in forming a mortise that has an outwardly-increasing diameter and a threaded inner end, and then placing within such mortise the threaded end of a spoke, and by longitudinal compression (and lateral expansion) causing such end to closely fill said mortise, substantially as and for the purpose shown.

3. As an improvement in the construction of metal wheels, the method employed for securing a spoke within a hub, which consists in forming a mortise that has an outwardly-increasing diameter and a threaded inner end, and then placing within such mortise the end of a spoke, and by longitudinal compression (and lateral expansion) causing such end to closely fill said mortise and the body of said spoke outside of said hub to be enlarged, substantially as and for the purpose set forth.

In testimony that I claim the foregoing I have hereunto set my hand this 21st day of October, 1887.

JAMES R. LITTLE.

Witnesses:
GUS. A. BAUMAN,
THEODORE C. POLING.